(12) United States Patent
 Anantharaman

(10) Patent No.: US 9,148,757 B2
(45) Date of Patent: Sep. 29, 2015

(54) METHOD FOR TRACKING A MOBILE DEVICE ONTO A REMOTE DISPLAYING UNIT

(71) Applicant: NAGRAVISION S.A., Cheseaux-sur-Lausanne (CH)

(72) Inventor: Subramanian Anantharaman, Bangalore (IN)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 14/397,323

(22) PCT Filed: May 23, 2013

(86) PCT No.: PCT/EP2013/060656
 § 371 (c)(1),
 (2) Date: Oct. 27, 2014

(87) PCT Pub. No.: WO2013/178533
 PCT Pub. Date: Dec. 5, 2013

(65) Prior Publication Data
 US 2015/0141061 A1   May 21, 2015

Related U.S. Application Data

(60) Provisional application No. 61/652,883, filed on May 30, 2012.

(30) Foreign Application Priority Data

May 30, 2012 (EP) ..................................... 12169948

(51) Int. Cl.
 *H04W 24/00* (2009.01)
 *H04W 4/02* (2009.01)
 (Continued)

(52) U.S. Cl.
 CPC ................ *H04W 4/02* (2013.01); *H04W 4/028* (2013.01); *H04W 12/02* (2013.01); *H04L 67/24* (2013.01); *H04W 88/14* (2013.01)

(58) Field of Classification Search
 None
 See application file for complete search history.

(56) References Cited

U.S. PATENT DOCUMENTS

2002/0080968 A1   6/2002   Olsson
2004/0106415 A1   6/2004   Maeda et al.
(Continued)

FOREIGN PATENT DOCUMENTS

EP        1631107        3/2006

OTHER PUBLICATIONS

International Search Report issued in International Application No. PCT/EP2103/060656 dated Nov. 4, 2013.
(Continued)

*Primary Examiner* — Suhail Khan
(74) *Attorney, Agent, or Firm* — DLA Piper LLP US

(57) ABSTRACT

The present invention refers to a method for tracking at least one mobile device onto a remote displaying unit through a mobile switching center connected to the mobile device by a wireless communication network and through a head-end linked to the mobile switching center and connected to the remote displaying unit by a second communication network different to the wireless communication network. The mobile device is identified by a mobile device identifier. The remote displaying unit is identified by a remote displaying unit identifier and is provided with a module for processing messages coming from the head-end identified by a head-end identifier. The mobile device is provided with a locating unit able to determine its current location and with a communication unit for supporting at least an instant messaging service.

19 Claims, 2 Drawing Sheets

(51) Int. Cl.
*H04W 12/02* (2009.01)
*H04L 29/08* (2006.01)
*H04W 88/14* (2009.01)

(56) References Cited

U.S. PATENT DOCUMENTS

2006/0103551 A1 5/2006 Weng et al.
2006/0173612 A1 8/2006 Steel
2006/0225108 A1 10/2006 Tabassi et al.
2011/0213969 A1* 9/2011 Nakhjiri et al. ............... 713/158

OTHER PUBLICATIONS

Written Opinion issued in International Application No. PCT/EP2103/060656 dated Nov. 4, 2013.

* cited by examiner

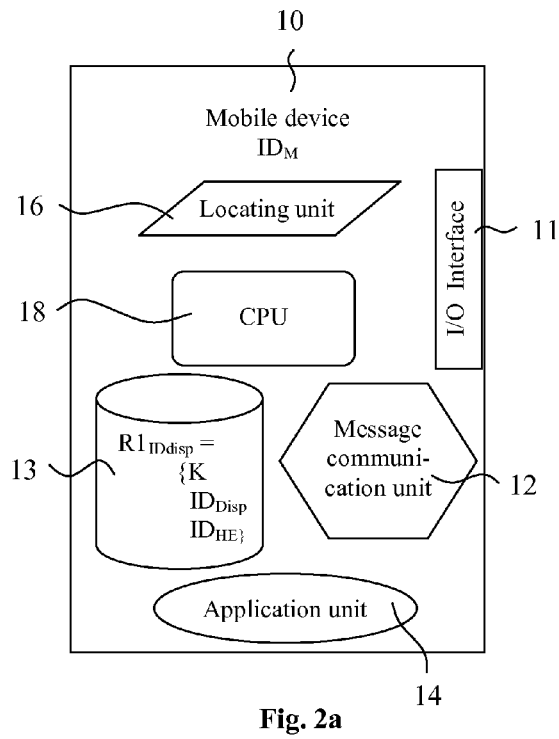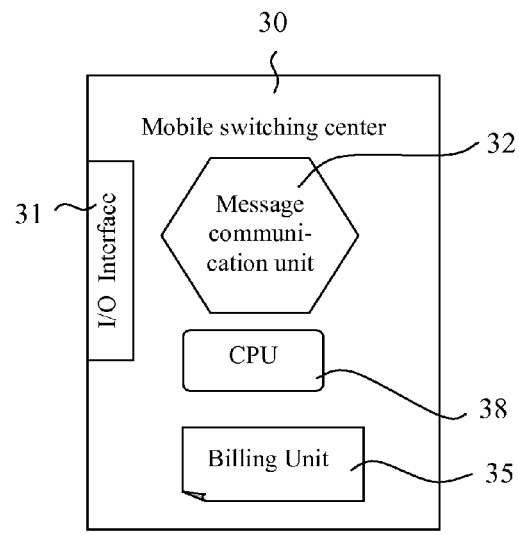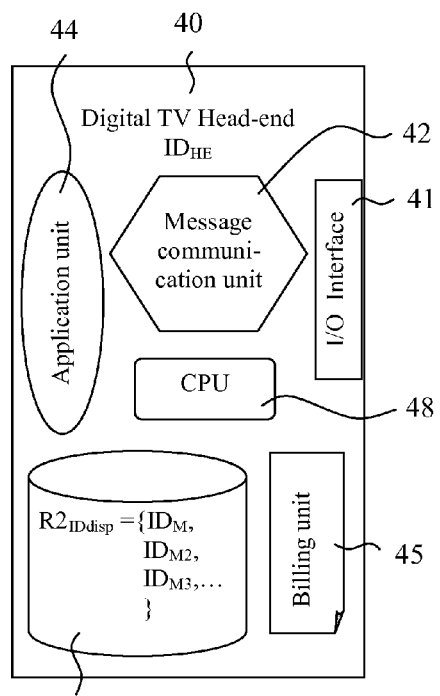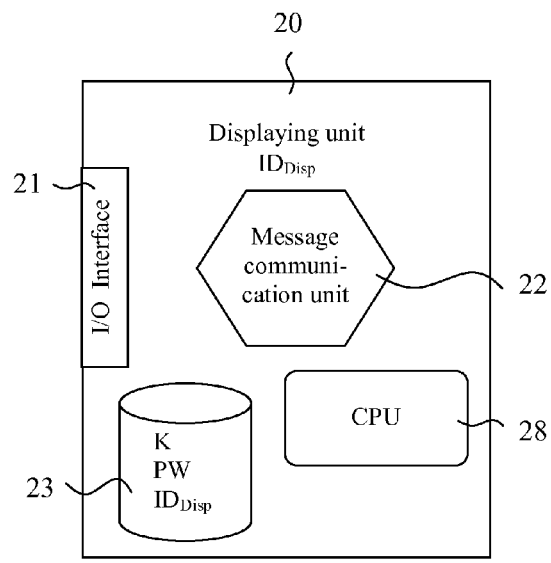

METHOD FOR TRACKING A MOBILE DEVICE ONTO A REMOTE DISPLAYING UNIT

CROSS REFERENCE TO RELATED APPLICATIONS

This application is a U.S. National Stage Application of International Application No. PCT/EP2013/060656 filed May 23, 2013, which claims priority from European Patent Application No. 12169948.2 filed May 30, 2012 and U.S. Provisional Patent Application No. 61/652,883 filed May 30, 2012.

TECHNICAL FIELD

The present invention relates to the field of digital television technology providing services to subscribers and refers to a method for tracking the geographical position of a mobile device. This mobile device is connected to a mobile switching center through a wireless communication network. This tracking is performed onto a remote displaying unit, such as a digital television, connected to a head-end through a second communication network, such as a wireline/IP network, different from the first communication network.

BACKGROUND

Mobile devices, such as mobile phones, are often provided with a location unit able to determine its current location either on the basis of satellite signals (i.e. GPS location system), or by any other position determination technology, such as positioning got by triangulation procedure with mobile phone antennas. By transmitting the location of a mobile phone onto a television system, it becomes possible, e.g. for friends or family members of the mobile phone user, to know where this user is and to track him, for instance on a map displayed on the TV screen, without calling him on his mobile phone.

For this purpose, the document US 2006/0103551 discloses a system for tracking a mobile unit with a GPS system and for displaying an electronic map on a displaying unit. The position data of the mobile unit is transmitted to a master control station. The user of the displaying unit needs to transmit the identifier (ID) of the mobile unit to the master control station, and then the latter transmits the position of the mobile unit to the displaying unit to show the user where the mobile unit has been located.

The document US 2006/0225108 discloses another system for communicating between a television device and one or more mobile stations in view to show the location of each mobile station on a map displayed on a screen of the television device. The television device is coupled to a broadcast network head-end and the latter couples the television device to a group communication server via Internet. The group communication server is coupled to a wireless network and collects and populates a message list table with new messages coming from the mobile device to be tracked. The server handles television device requests and responses. When receiving a location request from the television device, the server checks if the television device has the required rights for accessing to location information. If the access is granted, the location information is requested to the mobile device which sends its location to the group communication server.

The document EP1631107 discloses a method for access control between a control module and an autonomous locating module. The control module can be a personal computer of a user wanting to know the position of the autonomous locating module. The method involves sending a message containing an encrypted control value to the autonomous module. The latter checks this control value at each time it receives a message. This control value is generated by the control module and is sent to the autonomous locating module together with the identifier of the autonomous location module and with at least one command within an encrypted message. After having decrypted the message by means of a secret key, the mobile device executes the command only if the identifier and the control value are correct.

The location solutions suggested by these documents suffer from several drawbacks. For instance, some documents do not suggest any means for preventing a hacker to intercept a message comprising the location information sent by the mobile device in response to a location request message. Some systems disclose a master control station used for storing location information and dispatching them upon request from a user without worrying whether location information are outdated or have been recently acquired. In another case, the mobile device does not have any control onto the data referring to its location with respect to a user sending it a location request message via a server. Furthermore, message handling operations, performed both by the sender and the receiver, require significant computer resources which are not optimized.

SUMMARY OF THE INVENTION

The present invention suggests overcoming, at least partially, the aforementioned drawbacks by a method that, on the one hand protects sensitive data exchanged, via several communication networks of different kinds, between a displaying unit and a tracked mobile device, and on the other hand that optimizes the operations in order to preserve at least the resources of the mobile device.

To this end, the present invention suggests a method for tracking at least one mobile device onto a remote displaying unit, through a mobile switching center connected to the mobile device by a wireless communication network and through a head-end linked to the mobile switching center and connected to the displaying unit by a second communication network which is different from the wireless communication network. The mobile device, the displaying unit and the head-end are identified respectively by a mobile device ID, a displaying unit ID and a head-end ID. The mobile device is provided, on the one hand with a locating unit able to determine its current location and on the other hand with a communication unit for supporting at least an instant messaging service. The displaying unit is provided with a module for processing message coming at least from the head-end.

The method of the present invention comprises an initialization phase and an operating phase. The initialization phase comprises the steps of:
  generating a key K, preferably by the displaying unit, and encrypting it with a password PW shared between the displaying unit and the mobile device,
  introducing, in a memory of said mobile device, a first record referring to the displaying unit ID and comprising, the head-end ID and the key K.

The operating phase comprises the steps of:
  determining the current location of the mobile device by means of the locating unit of the mobile device, and encrypting this current location by using the key K,
  transmitting the mobile device ID and the encrypted current location to the displaying unit by sending a message successively addressed to the mobile switching center, to the head-end and to the displaying unit by means of their respective ID, decrypting the encrypted current location with the key K and displaying the location onto the displaying unit.

Further advantages and embodiments of the present invention will be described in the following detailed description.

BRIEF DESCRIPTION OF THE DRAWINGS

The present invention will be better understood thanks to the attached figures in which:

FIG. 2a to 2d are schematic views of each entity shown in FIG. 1 together with their main components.

DETAILED DESCRIPTION

Figure 1:
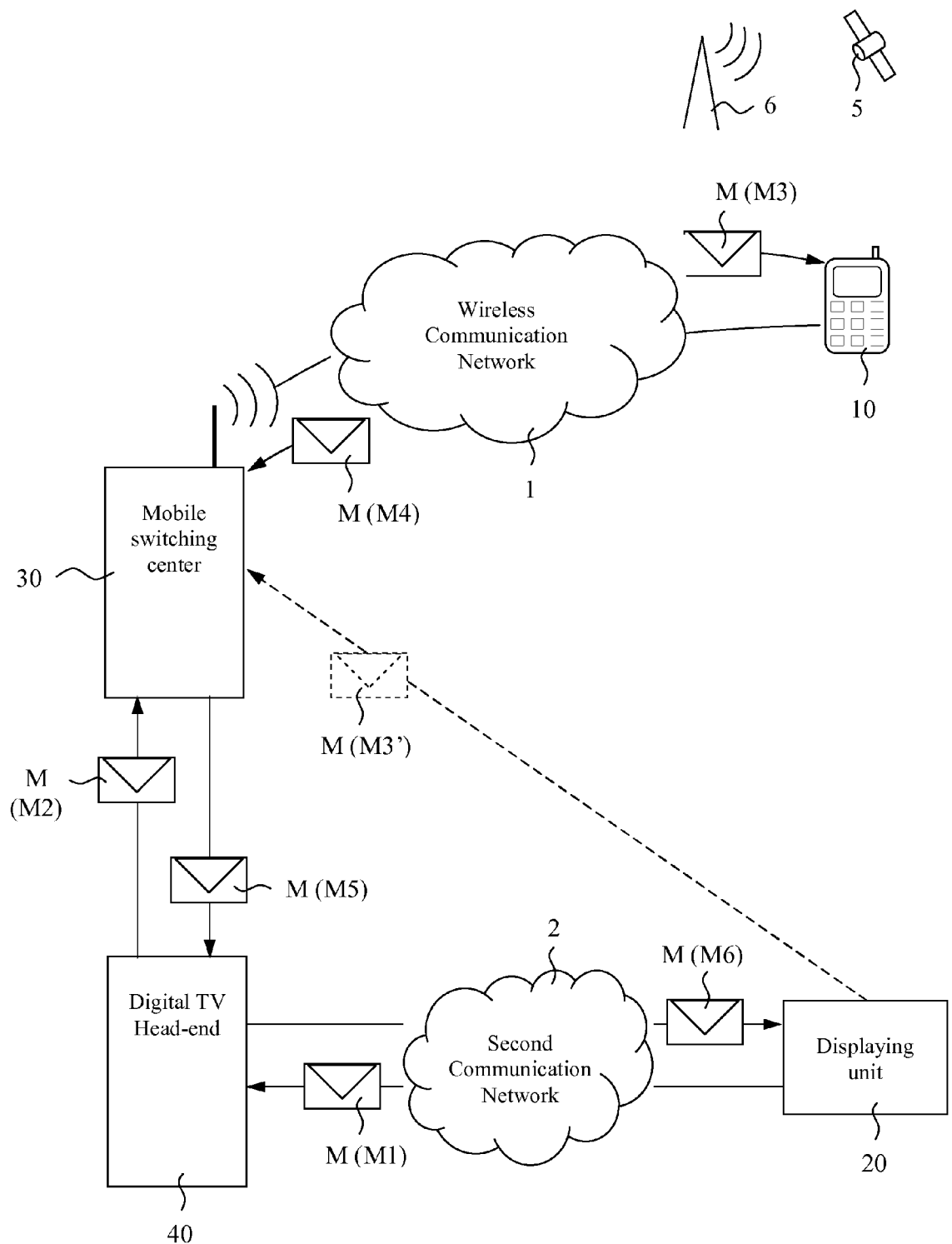
FIG. 1 schematically shows the main entities of the infrastructure for tracking a mobile device onto a displaying unit via a head-end and a mobile switching center in accordance with the present invention.

Referring to FIG. 1, it schematically illustrates the main entities involved in the present invention and the message transmission between these entities during at least the operating phase of the method.

According to the present invention, the geographical positions of at least one mobile device 10 can be tracked onto a remote displaying unit 20. The mobile device 10 can be a cell phone, a GPS tracker device or any other device able to determine and to communicate its current location through a wireless communication network 1. The geographical position of the mobile device 10 can be acquired, for instance, by means of the Global Positioning System (GPS) provided by satellites 5 or by means of a terrestrial triangulation system through GSM antennas 6. The displaying unit 20 is preferably a digital television since it corresponds to the most common displaying unit in households and can therefore be regarded as a fully suitable means for delivering information to people in a home environment. However, any other kind of displaying unit such as a personal computer, a tablet computer or a smartphone, which can be connected to the head-end through a second dedicated communication network 2 for receiving processing and sending messages, is also suitable.

As shown in FIG. 1, the mobile device 10 is connected to a mobile switching center (MSC) 30 through the wireless communication network 1 which is typically a mobile telephone network. The mobile switching center 30 is linked to the head-end 40, either by communication lines dedicated to specific data exchanges or by means of another network, such as an IP network. Finally, the head-end 40 is connected to the displaying unit 20 through a so-called second communication network 2 which is a fixed access network, preferably a terrestrial communication network made for instance of optical fibers or common telephone lines. One of the aims of the present invention is to establish a link between the mobile device and the displaying unit for exchanging at least confidential information by using their respective networks.

Referring to FIGS. 2a to 2d, each of the four main entities of FIG. 1 has been schematically illustrated, in a separate manner, to show the main components that are used for performing the method of the present invention.

FIG. 2a shows the components included into the mobile device 10, namely an input/output interface 11 for exchanging messages M at least through the mobile switching center 30, a communication unit 12 which is in particular a message communication unit 12 supporting at least an instant messaging service, a memory 13 for storing at least first records $R1_{IDdisp}$ referring to the displaying units that are authorized to track the mobile device, a locating unit 16 for providing the current location of the mobile device 10 and a central processing unit (CPU) 18 for managing the components of the mobile device. This mobile device is identified by a mobile device identifier $ID_M$ stored in the memory 13, within the mobile device. The mobile device identifier $ID_M$ can be for instance the call number of the mobile device 10 or any number which is specific to the SIM card (Subscriber Identity Module) of the mobile device. Each first record $R1_{IDdisp}$ stored in the memory 13 of the mobile device comprises at least a 3-tuple, namely the key K (i.e. one shared key according to a symmetric encryption scheme or a pair of public and private keys according to an asymmetrical encryption scheme), the displaying unit identifier $ID_{Disp}$, and the head-end identifier $ID_{HE}$. There is no need to also store the displaying unit identifier $ID_{Disp}$ into the first record given that this record already refers to this identifier, or at least to the corresponding displaying unit, owing to its name (i.e. its own identifier $R1_{IDdisp}$). The locating unit 16 can typically uses a GPS antenna for determining the current geographical position of the mobile device. If this antenna cannot acquire the required satellite signals for determining the location of the device, the locating unit 16 can uses e.g. a triangulation procedure with mobile phone antennas. Optionally, the mobile device can further include an application unit 14 which will be more detailed later.

FIG. 2b shows the components of the switching center 30 which is also provided with an input/output interface 31 for exchanging messages M on the one hand with the head-end 40, and on the other hand with at least one mobile device 10, a message communication unit 32 for processing messages M, an optional billing unit 35 and a central processing unit 38. As described in the present invention, the mobile switching center 30 is not provided with a specific identifier given that it refers here to a generic name which globally includes the whole mobile telephone infrastructure, namely base stations (mobile telephone antennas generally called air interface) and the base station controller to which base stations are connected (e.g. by wire connections) and which is responsible for managing distribution of resources.

Referring to FIG. 2c, the head-end 40 also comprises an input/output interface 41 for exchanging messages M, on the one hand with at least one displaying unit 20, and on the other hand with the mobile switching center 30. Similarly, it includes at least a message communication unit 42 for processing messages M (e.g. within a message processing module) and a central processing unit 48. The head-end is identified by a unique head-end identifier $ID_{HE}$ which can be stored in a memory within the head-end or in an optional database 43. Optionally, it can further comprises an application unit 44 and/or a billing unit 45 which will be described more in detail later.

Finally, the displaying unit 20, as shown in FIG. 2d, comprises an input/output interface 21 for exchanging at least messages with the head-end 40, these messages being preferably formatted in accordance with the protocol of the second communication network 2. In order to handle and process messages transiting through the I/O interface, the displaying unit also comprises a module or a message communication unit 22, in particular for preparing, sending and receiving at least messages M that refer to location of the mobile device. It also comprises a second database 23 for storing the key K (i.e. one shared key according to a symmetric encryption scheme or a pair of public and private keys according to an asymmetrical encryption scheme), to be used for the encryption/decryption of at least sensitive data contained in the messages M, and a password PW used for encrypting the key K. This key must be securely exchanged between the displaying unit 20 and the mobile device 10 whether the exchange is performed through the communication networks 1, 2, typically during an initialization phase. The displaying unit 20 is identified by a unique displaying unit identifier $ID_{Disp}$ which can be stored either in the second database 23 or in a memory within the displaying unit. In the same way as for other main entities, all the components of the displaying unit are managed by a central processing unit 28.

The method of the present invention comprises two main phases, namely an initialization phase and an operating phase.

The initialization phase comprises two main steps. The first step is to generate a key K and to encrypt it with a password PW shared between the displaying unit 20 and the mobile device 10. Sharing the password can be made by any means, e.g. through a telephone call, by sending a letter or an electronic mail, orally at a meeting, etc. The key K can be generated by a random or pseudo-random key generator, preferably at the displaying unit side.

Depending on the kind of cryptographic scheme (i.e. symmetric or asymmetric encryption), the key used by the displaying unit can be either the same as that used by the mobile device or can refers to unique pairs of public and private keys. Public keys can be further authenticated by a public key certificate signed by a trusted central authority. This certificate can be sent together with a signature of the message that provides a digest of the message, e.g. by means of a hash function. Upon receipt of the message, this digest can be compared with a digest obtained by using the public key provided with the certificate. If the two digests are identical, the message is authentic and has not been altered by a third party. Alternately, such an authentication process could be applied onto the data referring to the key K and/or to the current location instead of the entire of the message containing one or other of this data. The symmetric-key algorithm, the public-key cryptography, digests and signed certificates are security tools which are well known from the person skilled in the art and are therefore not further detailed in the present description.

According the preferred embodiment, the key K is a symmetric key and is generated by the displaying unit 20. However, it could be also generated by a key generator located outside the displaying unit 20, for instance within the mobile device 10 or even within the head-end 40 if the latter has previously obtained the necessary information to transmit the key, both to mobile device 10 and to the displaying unit 20.

The second main step of the initialization phase refers to introducing, in a memory of the mobile device 10, a first record $R1_{IDdisp}$ referring to the displaying unit 20, e.g. to the displaying unit identifier $ID_{Disp}$, and comprising the head-end identifier $ID_{HE}$ and the key K. Setting up such a first record can be performed by several manners. For instance the data could be sent from the displaying unit 20 to the mobile device 10 through one or several messages M (which can be called initialization messages), either via the head-end 40 and the mobile switching center 30, or directly to the mobile device 10 through the mobile switching center. This latter solution can be performed either directly by the displaying unit 20, whether it is provided with communication means for directly sending an instant message to the mobile device, or by means of an intermediate device (e.g. an additional mobile phone) which supports an instant messaging service. According to this latter case, it could be envisaged that the displaying unit displays the encrypted key K on its screen, then this encrypted key is read and sent through an instant message by a user using an additional mobile phone.

If the initialization message is sent by the displaying device successively through the head-end and through the mobile switching center, the content of the message sent to the head-end comprises at least the encrypted key K and the identifiers $ID_M$ and $ID_{Disp}$. In variant, this initialization message can also comprise the identifier $ID_{HE}$ of the head-end 40. Advantageously in this latter case, the head-end only needs to forward this initialization message to the mobile switching center 30, without having to complete this message. Once received by the mobile switching center, this initialization message no longer needs to include the identifier $ID_M$, since the mobile switching center now knows that it must send this final initialization message to the mobile device identified by this $ID_M$.

Whatever the above ways for send the key K, this key is never send in clear text but it is always sent in an encrypted form. For encrypting the key K, the password PW is used as an encryption key of a suitable algorithm which is installed, within an encryption/decryption unit, both in the mobile device and in the displaying unit. Such an encryption unit can be located for instance within the respective message communication units 12, 22. As the key K is never sent in clear text between the displaying unit 20 and the mobile device 10, if it is intercepted by a malicious person, this key cannot be decrypted without the password PW which is kept secret.

Alternately, the key K can be displayed in clear text on the screen of the displaying unit 20 and then can be manually entered into the mobile device 10 by the user of this mobile device. As the displaying unit is located in a private area (typically a private household), there is no risk to display it in clear onto the screen for entering it directly into the mobile device 10.

Alternately, all or a part of the data (i.e. $ID_{Disp}$, $ID_{HE}$, K) to be included in the first record $R1_{IDdisp}$ could be displayed in clear text on the screen of the displaying unit in view to be manually entered into the mobile device 10, e.g. via a keyboard or any other suitable interface, requiring a wire connection (e.g USB cable) or a wireless connection (e.g. Bluetooth, Wi-Fi) with the displaying device 20.

At the end of the initialization phase, the mobile device 10 has stored all the data which are necessary for encrypting the sensitive information (i.e. for encrypting the current location of the mobile device), then sending this information to the displaying unit 20 successively through the mobile switching center 30 and through the head-end 40. Indeed, the mobile device knows the key K, the head-end identifier $ID_{HE}$ from which the head-end address can be found and the displaying unit identifier $ID_{Disp}$ from which the address of the displaying unit can also be found. Advantageously, no additional data should be stored in the mobile device 10 and these data do not require any updating. Therefore, the computer resources of the mobile device are preserved as much as possible. If necessary, the initialization phase can be easily performed as many times as needed later, e.g. for changing the key K. Besides, the memory 13 of the mobile device 10 can store several first records $R1_{IDdisp}$ pertaining to different displaying units 20, so that it can be tracked simultaneously by several displaying units.

Once the initialization phase ended, the mobile device can optionally send a confirmation message addressed to the displaying unit 20 for confirming that the steps of the initialization phase have been completed and that the mobile device 10 is ready to perform the operating phase. Such a confirmation message can be a message providing the current location of the mobile device in the same way as a message sent by the mobile device according to the operating phase which is described hereafter.

The second phase of the present method is the operating phase which can be handled as soon as the password PW has been shared (between the displaying unit and the mobile device) and as soon as the first record $R1_{IDdisp}$ (together with its data) has been stored in the memory 13 of the mobile device. The operating phase comprises the steps of:

determining the current location of the mobile device 10, by means of its locating unit 16, and encrypting this current location by using the key K, transmitting the mobile device $ID_M$ and the encrypted current location to the displaying unit 10 by sending a message M successively addressed to the mobile switching center 30, to the head-end 40 and to the displaying unit 20 by means of their respective identifier, namely the $ID_{HE}$ and the $ID_{Disp}$.

decrypting the encrypted current location with the key K within the displaying unit 20 and displaying the location onto this displaying unit (i.e. onto the screen of this unit).

Advantageously, the invention according to the preferred embodiment suggests the encryption of the current location only, in order to help save computer resources. Besides, as the key K is preferably stored in a non-encrypted form into the mobile device, this key K can be immediately used for all successive encryption operations, performed in the mobile device during the operating phase, without asking the user of the mobile device to enter the password PW.

According to one embodiment, the operating phase is trigged by the reception, at the mobile device 10, of a location request message comprising at least the displaying unit identifier $ID_{Disp}$ which is the sole information that the mobile device needs to know for sending a message to the appropriate displaying unit 20, e.g. in reply to the location request message. This location request message is addressed to the mobile device (by means of its identifier) and it is relayed at least by the mobile switching center. If this message also transits through second communication network 2, i.e. via the head-end, its content has to further include the head-end identifier $ID_{HE}$ to perform a correct message routing.

Alternately, the mobile device 10 can transmit, at regular time intervals, its identifier $ID_M$ and the encrypted current location to the displaying unit 20 by sending a message M successively addressed to the mobile switching center 30, to the head-end 40 and to the displaying unit 20 by means of their respective ID. Thus, the current location data may also be sent without receiving each time a location request message from the displaying unit. A location request message to the mobile device could comprises parameters for instructing this mobile device to send its current location (and its identifier $ID_M$) at a certain time interval within a time period that can be defined either by a certain duration or by a starting date/time and an ending date/time. Anyway, whatever the method that initiates the transmission of messages comprising location data referring to the mobile device, these messages always pass first through the wireless communication network 1, and then through the second communication network 2, before reaching the displaying device 20.

As shown in FIG. 1, the messages M sent between the four main entities 10, 20, 30, 40 do not necessarily provide the same content. This is the reason why the messages M have been also each identified in this figure by a number (M1 to M6) which is different between each entity and according to the direction of the message.

In order to transmit its current location to the displaying unit, the mobile device firstly sent to the mobile switching center 30 a message M4 addressed to the displaying unit identifier $ID_{Disp}$. The content of the message M4 includes at least the encrypted current location and the identifiers $ID_{HE}$ and $ID_{Disp}$ for allowing a correct message routing. Then, the mobile switching center 30 relays at least a part of this content by sending a message M5 to the head-end 40. The content of the message M5 comprises at least the encrypted current location and the identifiers $ID_M$, $ID_{Disp}$. This content allows, on the one hand to know the ID of the sender (i.e. the mobile device ID), and on the other hand to continue the routing of the message. Finally, the head-end 40 relays, in turn, at least a part of the content of the preceding message M5 by sending a message M6 to the displaying unit 20. The content of this message M6 includes at least the encrypted current location and the identifiers $ID_M$, so that the displaying unit knows which mobile device the enclosed current location refers.

By complementing the messages M4 and M5 respectively with $ID_M$ and $ID_{HE}$, these messages can have the same content and the task of the mobile switching center 30 may just consist in forwarding the message M4 received from the mobile device to the head-end. Similarly, if the message M6 includes the identifier $ID_{Disp}$, the messages M5 and M6 becomes identical and the head-end can just forward the message M5 to the displaying unit without any amendment of his content. Finally, it could be envisaged that the mobile device 10 generates a message M4 which is ultimately addressed to the displaying device and which comprises all the necessary data for avoiding any amendment of its content along its routing through the mobile switching center 30 and through the head-end 40.

Advantageously, the sensitive data such as the key K and the data about the current location of the mobile device are never disclosed neither to the mobile switching center nor to the head-end. Moreover, these sensitive data are even not recorded in any one of such intermediate entity and are always kept encrypted during their transit between the mobile device and the displaying unit. Therefore, a mutual trusted relationship can be established between the sender and the receiver since the confidentiality upon critical data is maximized, thus reducing any hacking risk. Preferably, these precautionary measures are advantageously applied and limited to confidential data only.

The messages exchanged between the mobile device 10 and the mobile switching center 30 are instant messages (real time messaging), such as SMS (Short Message Service), MMS (Multimedia Messaging Service) or WhatsApp (an alternative to SMS). These messages can be processed by the message communication unit 12 for reading message received from the mobile switching center and for preparing messages to be sent as replies.

As for the location request message, it can be addressed to the mobile device 10 either through the second communication network 2, via the head-end 40, by sending a first message M1 which is successively relayed by means of a second message M2 sent from the head-end 40 to the mobile switching center 30 and then by means of the third message M3 (i.e. an instant message) sent from the mobile switching center 30 to the mobile device 10.

In such a message routing where the location request message is initiated by the displaying unit and firstly relayed by the head-end by means of its identifier $ID_{HE}$, the content of the first message M1 comprises at least the mobile device identifier $ID_M$ and the displaying unit identifier $ID_{Disp}$. The content of the message M2 is at least the same as that of the first message M1, and the content of the instant message M3 comprises at least the displaying unit identifier $ID_{Disp}$. Advantageously and according to the preferred embodiment of the present invention, there is no need to include an instruction or a specific command to such messages because they can be immediately recognized (e.g. owing to their specific format) as being location request messages, at least by the mobile device, e.g. through its message communication unit 12 and/or its application unit 14.

Depending on the message routing suggested by the present invention, the content of this third message M3 can be directly sent by the displaying unit 20 in the case where this unit 20 is able to send an instant message to the mobile device 10 via the mobile switching center. This last way is illustrated in FIG. 1 by means of the message M3' sent from the displaying unit 20 to the mobile switching center 30 which in turn relays it by sending the message M3 to the mobile device 10. In the case where the displaying unit 20 is not provided for sending such a message M3', this message M3' could be sent by an additional mobile device connected to this purpose to the displaying unit 20.

According to another embodiment, the second record $R2_{IDdisp}$ referring to the displaying unit 20 is stored in a database 43, preferably located within the head-end 40. The second record includes the mobile device identifiers $ID_M$ of each mobile device 10 tracked by the displaying unit 20. Thus, a location request message (e.g. sent by the displaying unit) can be addressed, at least partially, to the mobiles devices 10 having their mobile device identifier $ID_M$ included in the second record $R2_{IDdisp}$ referring to the displaying unit 20. Preferably, such a location request message is addressed to all mobile devices 10 of a same community, namely to all mobile devices having their mobile device identifier $ID_M$ in the aforementioned second record $R2_{IDdisp}$. Advantageously, the same key K can be shared and used by all the mobile devices of the same community thus reducing management of a plurality of keys, in particular within a public-key cryptography scheme. Alternately, the database 43 could be also located within the displaying device 20. However, instead of sending only one short location request message with only one mobile device identifier $ID_M$ from the displaying to the head-end, this alternate solution requires sending either a longer location request message including all the needed mobile device identifiers $ID_M$, or several short location request messages, i.e. one message per mobile device identifier. Therefore, it is more efficient and judicious to implement the database 43 within the head-end and to let the head-end manage the content of this database.

Optionally, the mobile device identifier $ID_M$ identifying the mobile device 10 to which the location request message is addressed, can be checked by verifying if this identifier $ID_M$ is already included in the second record $R2_{IDdisp}$ referring to the displaying unit identifier $ID_{Disp}$ from which said location request message has been sent. In case of negative outcome, this mobile device identifier $ID_M$ is added to this second record $R2_{IDdisp}$. By this means, the list of the mobile devices tracked by the displaying unit referring to this second record can be easily and automatically updated without needing a specific request for updating the content of second record $R2_{IDdisp}$.

As an alternative of the present invention, in particular according to a more developed embodiment of the initialization phase, the setting up of the first record $R1_{IDdisp}$ stored in the memory of the mobile device 10 is performed by sending, to this mobile device 10, an initialization message relayed at least by the mobile device switching center 30 through the wireless communication network 1 and comprising at least the displaying unit identifier $ID_{Disp}$, the head-end identifier $ID_{HE}$ and the key K in its encrypted form.

Depending on the embodiment of the initialization phase of the present method, this initialization message can be sent in the same manner as for the message M3' shown in FIG. 1, namely either directly from the displaying unit 20 or from an additional mobile device (e.g. a mobile phone supporting an instant messaging service).

According to another message routing, the initialization message is sent to the mobile device 10, successively by sending it to the head-end 40 (from the displaying unit 20), then to the mobile switching center 30 (from the head-end 40) and by using the respective identifiers, namely the head-end identifier $ID_{HE}$ and the mobile device identifier $ID_M$. Thus according to this message routing, the initialization message successively passes through the second communication network 2, then through the mobile communication network 1.

According to another embodiment, the initialization message received by the mobile device further comprises an application to be installed in the mobile device 10, e.g. within an application unit 14 as shown in FIG. 2a. Such an application refers to computer software designed to perform specific tasks. In particular, this application can be used for automatically processing incoming location request messages. Aiming to request a geographical position either on demand from the displaying unit 20 or from the head-end 40, such messages can be recognized by the application, for instance owing to their specific format or by means of a header included in each message.

As an example, this application once installed into the application unit of the mobile device can perform the following steps before setting up the first record $R1_{IDdisp}$ during the initialization phase:

asking for entering the password PW, decrypting the key K with the entered password PW', verifying the conformity of the decrypted key and, in case of positive outcome, authorizing the setting up (introduction) of the first record referring to the displaying unit identifier $ID_{Disp}$.

Advantageously, there is no need to memorize the password PW into the memory of the mobile device for comparing it with the entered password PW' in order to further give access to the implementation of the first record. Indeed, the password is used as a decryption key for decrypting the encrypted key K. If the entered password PW' is identical to the password PW which was used for the encryption of the key K, then the result of the decryption of the key K will correspond to the correct key K. This key K can have, for example, a specific format or a specific header to verify the compliance of the decrypted key and, in case of positive outcome, to authorize the setting up of the first record (in the memory of the mobile device) together with its content, namely the head-end identifier $ID_{HE}$ and the key K.

Although the step aiming to verify the conformity of the decrypted key before setting up the first record referring to the displaying unit identifier is not really necessary, it is recommended not to skip this verifying operation in order to avoid the implementation of a first record having an incorrect format or comprising wrong data.

Other applications can be implemented into an application unit (such as the application unit 44) within the head-end 40 and/or even within the displaying unit 20. An application can be implemented for instance into the head-end in order to manage and handle the second records $R2_{IDdisp}$ stored in its database 43. For instance, such an application could be used for sending a location request message to all the identifiers $ID_M$ comprises in one second record $R2_{IDdisp}$. The sending of such location request messages can be performed as soon as the head-end receives, from the displaying unit 20, a message M1 asking for a location request of one of these identifiers.

According to another embodiment, at least a part of the messages M exchanged between the mobile device 10 and the displaying unit 20, via the mobile switching center 30 and preferably via the head-end 40, is counted for billing purposes in an account referring either to the displaying unit identifier $ID_{Disp}$ or to the mobile device identifier $ID_M$. Billing operations can be handled by the billing units 35, 45, as shown in FIG. 2b and FIG. 2c.

According to a preferred embodiment, the account is located in the database 43, within the head-end 40, and is used for counting messages M6 transmitted from the head-end to the displaying unit 20.

In order to compel the messages sent from the mobile device to the displaying unit to transit through a billing entity, sensitive data referring to the current location of the mobile can be protected by an over-encryption layer that can be removed by this entity only. Such an entity may preferably be the head-end, although the mobile switching device is not excluded. Applying such a protection can be performed by forcing the mobile device to over-encrypt a part of the content comprised in the message M4 by means of a second key K2 (together with an encryption/decryption algorithm which can be the same algorithm as that used with the key K). This second key K2 is preferably stored within the mobile device as data referring to the displaying unit, e.g. referring to the displaying unit identifier $ID_{Disp}$. This second key K2 can be generated by a key generator within the aforementioned entity, preferably within the head-end 40 and has to remain unknown to the displaying unit 20 and to any user. Once received by this entity (head-end), the latter proceeds with the removal of the over-encryption layer by using this second key K2 (together with the same encryption/decryption algorithm that has been previously used to apply the over-encryption layer). Thus, data referring to current location of the mobile device are merely encrypted by the key K and then can be sent to the mobile device within the message M6 as previously explained in the embodiments that do not refer to such an over-encryption layer. Advantageously, if this entity (e.g. the head-end) is by-passed due to hacking and that messages do not transit through this entity, for example to avoid any billing operation, the displaying unit will be unable to access to data referring to the current location of the mobile device since this information will be still encrypted by the second key K2.

The second key K2 can be stored in a secret manner into the memory 13 of mobile device. According to a further embodiment, the access to this second key K2 can be protected by a second password PW2 known by the mobile device and the aforementioned entity (e.g. the head-end), but remaining unknown to the displaying unit and to any user.

To implement the second key K2 into the mobile device, this step can be performed e.g. through the installation of the application into the application unit 14, via an initialization message. Alternately, the transmission of the second key K2 to the mobile device can be performed through a maintenance message sent by the entity (head-end) after having generated it by means of a key generator (e.g. the same key generator as that used for generating the key K). Alternately, maintenance messages can be used for renewing the second key K2, preferably at unpredictable time intervals so it becomes difficult to intercept the second key K2, in particular if this second key K2 is not protected by the second password PW2.

Upon receipt, such maintenance messages can be automatically recognized (e.g. owing to their specific format) by the mobile device, in particular through its message communication unit 12 or by means of the application running in the application unit 14, as containing said second key K2 and processed as such, e.g. by the aforementioned application.

Moreover, this second key K2 can be changed at any time by said entity. Alternately, the second key K2 can be encrypted by the second password PW2 which can be previously stored and hidden within the mobile device, for instance within its memory or within the application when it is installed into the application unit 14 via an initialization message. After receiving a maintenance message, the application may be able to automatically recover the second password PW2 by extracting it from the mobile device in order to decrypt the second key K2 contained in this message.

According to another embodiment, the over-encryption layer could be extended to the entire message M4, however with the exception of the head-end identifier $ID_{HE}$ which must be kept in clear text for an adequate message routing. Then, the message M4 encrypted by the second key K2 could be redirected by the mobile switching center towards the head-end. Thus, the message M4 would be converted into the message M5 whose data encrypted by the second key K2 would be identical to those contained in the message M4. Finally, the head-end can processes the over-encrypted message M5 in the same manner as explained here-above for removing the over encrypted layer and transmitting the message M6 to the displaying unit.

As for the identifiers, it should be noted that the identifiers $ID_{HE}$ and $ID_{Disp}$ can correspond to any number or any address allowing to find the corresponding head-end, respectively the corresponding display unit, in order to deliver the message to the correct recipient.

According to one embodiment, when a location request message has been addressed to the mobile device 10, the displaying unit 20 can regularly question the head-end 40 to see if it has received one or several messages addressed to the displaying unit 20, typically as a response to the location request message previously sent. If at least one message has been received by the head-end at the attention of the displaying unit, the latter can retrieve this message in accordance with a so-called "pull technology". On the contrary, if the displaying unit 20 does not need to go pick up the messages on the head-end acting as a server, the configuration corresponds to the "push technology" because the server sends automatically the message to the displaying unit. Any of these technologies can be applied by the displaying device 20 for retrieving, from the head-end 40, messages M6 comprising the current location data of the mobile device 10. Depending on the method used to route the messages to the displaying unit, the latter can transmit to the head-end 40 its identifier $ID_{Disp}$ together with its address prior to any exchange, for instance during the initialization phase.

It should be also noted that the displaying unit 20, as named in the present description, refers more particularly to a set of apparatus such a digital television connected to a set-top-box. This set of apparatus can be further connected to other devices (e.g. a recorder unit) and/or connected to at least one network which is distinct from the first and second networks 1 and 2, e.g. to a home network (LAN).

The step aiming to display the location of the mobile device onto the screen of the displaying unit can be performed by several manners, for instance by displaying a mark onto a scalable map, by displaying the corresponding postal address or by displaying the coordinates of the mobile device within a geographical coordinate system.

The invention claimed is:

1. A method for tracking at least one mobile device on a remote displaying unit through a mobile switching center connected to the mobile device by a wireless communication network and through a head-end linked to the mobile switching center and connected to the displaying unit by a second communication network different from the wireless communication network, said mobile device being identified by a mobile device identifier, said remote displaying unit being identified by a remote displaying unit identifier and being provided with a module for processing messages coming from the head-end identified by a head-end identifier, said mobile device being provided with a locating unit able to determine a current location of the mobile device and with a communication unit for supporting an instant messaging service, said method comprising:
  performing an initialization phase comprising;
    generating a key and encrypting the key with a password shared between the remote displaying unit and said mobile device; and
    storing, in a memory of said mobile device, a first record referring to the displaying unit identifier and comprising the head-end identifier and said key;
  performing an operating phase comprising;
    determining the current location of the mobile device and encrypting by the mobile device the current location by using the key;
    transmitting, by the mobile device, the mobile device identifier and the encrypted current location to the displaying unit by sending a message successively addressed to the mobile switching center, to the head-end and to the remote displaying unit by means of their respective identifiers; and
    decrypting the encrypted current location with the key and displaying said location on the remote displaying unit.

2. The method of claim 1, wherein the operating phase is trigged by the reception, at the mobile device, of a location request message comprising at least the remote displaying unit identifier, said location request message being addressed to the mobile device and relayed at least by the mobile switching center using respective identifiers of the mobile device and the mobile switching center.

3. The method of claim 2, wherein said location request message is initiated by the remote displaying unit and firstly relayed by the head-end using its identifier.

4. The method of claim 2, wherein a second record referring to said remote displaying unit is stored in a database located either within the head-end or within the remote displaying unit, said second record including mobile device identifiers of each mobile device tracked by said remote displaying unit and said location request message is addressed, at least partially, to the mobiles devices having their mobile device identifier included in said second record.

5. The method of claim 4, wherein the mobile device identifier identifying the mobile device to which the location request message is addressed is checked by verifying if said mobile device identifier is already included in the second record referring to the remote displaying unit identifier, in case of negative outcome said mobile device identifier is added to said second record.

6. The method of claim 1, wherein the storing of said first record in the memory of the mobile device is performed by sending, to said mobile device, an initialization message relayed at least by the mobile switching center through the wireless communication network, the initialization message comprising at least the remote displaying unit identifier, the head-end identifier and the key, wherein at least the key being sent in encrypted form.

7. The method of claim 6, wherein said initialization message is successively addressed to the head-end from the remote displaying unit, then to the mobile switching center from the head-end, by using their respective identifiers.

8. Method The method of claim 6, wherein the initialization message received by the mobile device further comprises an application, configured for installation in the mobile device, for automatically processing incoming location request messages.

9. The method of claim 8, wherein during the initialization phase, said application causes the mobile device to perform the following steps:
  asking for entering the passwords;
  decrypting the key with the entered password; and
  verifying a conformity of the decrypted key and, if the conformity is verified, authorizing storage of the first record referring to the remote displaying unit identifier.

10. The method of claim 1, wherein at least a part of messages exchanged between the mobile device and the remote displaying unit, via the mobile switching center and preferably via the head-end, is counted for billing purposes in an account referring either to the remote displaying unit identifier or to the mobile device identifier.

11. The method of claim 10, wherein said account is located in the database of the head-end for counting messages transmitted to the remote displaying unit.

12. The method of claim 1, wherein said initialization phase further comprises the step of:
  generating a second key unknown to the remote displaying unit and storing said second key within the mobile device as data referring to the remote displaying unit; and
  said operating phase further comprises the steps of:
    using said second key for over-encrypting the encrypted current location before its transmission within the message successively addressed to the mobile switching center, to the head-end and to the remote displaying unit; and
    removing said over-encryption layer before said message has reached the remote displaying unit by using said second key.

13. The method of claim 12, wherein said second key is stored in the memory of the mobile device and its access is protected by a second password which is unknown to the remote displaying unit and to any user.

14. The method of claim 12, wherein implementation of the second key into the mobile device is performed through the installation of the application in said mobile device.

15. The method of claim 12, wherein the second key stored in the mobile device is renewed at unpredictable time intervals by sending to said mobile device a maintenance message that can be automatically recognized as containing said second key and processed as such, upon receipt by said mobile device.

16. A method for enabling tracking of a mobile device comprising:
  storing, by the mobile device in a memory of the mobile device, a first record referring to a remote displaying unit identifier identifying a remote displaying unit, the first record comprising a head-end identifier identifying a head-end and a key, the key being encrypted with a password shared between the remote displaying unit and the mobile device, the mobile device being connectable to the remote displaying unit through a mobile switching center connectable to the mobile device by a wireless communication network and through the head-end, which is linked to the mobile switching center and connectable to the remote displaying unit by a second communication network different from the wireless communication network, the mobile device including a locating unit capable of determining a current location of the mobile device, the mobile device further being provided with a transceiver for supporting at least an instant messaging service;

determining by the mobile device a current location of the mobile device by the locating unit of said mobile device and encrypting by the mobile device the current location using the key; and transmitting by mobile device the mobile device identifier and the encrypted current location to the remote displaying unit by sending a message successively addressed to the mobile switching center, to the head-end and to the remote displaying unit by means of their respective identifiers;

whereby the remote displaying unit may decrypt the encrypted current location with the key and display said location on the remote displaying unit.

17. The method of claim 16, wherein said location request message is initiated by the remote displaying unit and firstly relayed by the head-end using its identifier.

18. A mobile device comprising:
a memory;
a transceiver;
a locating unit; and
a processor connected to the memory, the locating unit and the transceiver;
wherein the processor is configured to:
store in the memory, a first record referring to a remote displaying unit identifier identifying a remote displaying unit, the first record comprising a head-end identifier identifying a head-end and a key, the key being encrypted with a password shared between the remote displaying unit and the mobile device, the mobile device being connectable to the remote displaying unit through a mobile switching center connectable to the mobile device by a wireless communication network and through the head-end which is linked to the mobile switching center and connectable to the remote displaying unit by a second communication network different from the wireless communication network, the locating unit being configured to determine a current location of the mobile device, the mobile device further being configured for supporting at least an instant messaging service via the transceiver;

determine a current location of the mobile device using the locating unit and encrypting by the mobile device the current location using the key; and transmit the mobile device identifier and the encrypted current location to the remote displaying unit by sending via the transceiver a message successively addressed to the mobile switching center, to the head-end and to the remote displaying unit by means of their respective identifiers;

whereby the remote displaying unit may decrypt the encrypted current location with the key and display said location on the remote displaying unit.

19. The mobile device of claim 18, wherein the locating unit is a global positioning system receiver.

* * * * *